Patented July 11, 1944

2,353,271

UNITED STATES PATENT OFFICE 2,353,271

LOOSE-FILL COMPOSITION MATERIAL

Charles H. Schuh, Ridgewood, N. Y., assignor, by mesne assignments, to Carbide and Carbon Chemicals Corporation, New York, N. Y., a corporation of New York No Drawing. Application May 1, 1939, Serial No. 271,201

16 Claims. (Cl. 106—93)

This invention relates to what is commonly known as loose-fill insulation material and to methods of producing the same, and more particularly to a loose-fill material that will effectively resist the penetration of water into its mass when loosely packed into a vessel or confining space.

More specifically, the invention relates to a loose-fill material comprising a cork-fiber composition and which may be prepared in part according to the teachings of my copending applications Serial Nos. 179,867, now Patent No. 2,345,009, and 46,742, now Patent No. 2,156,309, of which the present application is a continuation-in-part. The present invention is also a continuation-in-part of my application of even date herewith, Serial No. 271,202, now Patent No. 2,345,431.

Present loose-fill insulations comprise natural or artificial fibrous materials or granulated, and in some cases puffed-up granulated, materials. Some of these materials readily settle, others powder, and some are high in density and thermal conductivity. Moreover, while some are in themselves more or less water-resistant and others have been chemically treated to so-called "waterproof" them, none when taken as a mass are at all impervious to water and such applies as well to the recently proposed glass fiber, which in itself is entirely "waterproof." Consequently, in using conventional loose-fill insulation in practice where moisture conditions are encountered as in low temperature refrigeration work, the mass of the insulation must be protected by packaging in a moisture proof asphalted paper or otherwise sealed in its place of use.

It is the aim of the present invention to overcome the difficulties encountered in practice with conventional loose-fill materials, and to provide a loose-fill material with many new and improved properties.

Another object of the invention is to provide a loose-fill material, the particles of which comprise a particulate fiber composition having a microcellular structure.

A further object of the invention is to form a loose-fill material from a dried matrix of a particulate fiber composition prepared in accordance with the teachings of my aforesaid copending applications by grinding the dried matrix material to a light, fluffy loose-fill material.

Another object of the invention is to provide a loose-fill insulation which will repel water from its mass and thus eliminate the necessity of packaging and sealing in its place of use.

A still further object is to provide a loose-fill insulation material that will not settle to a heavy density.

Another object is to provide a loose-fill insulation that has a low thermal conductivity and is economical to manufacture.

A further object is to provide a loose-fill material comprising a regranulated cork-fiber composition.

Another object is to provide a light weight, fluffy loose-fill material consisting of a ground matrix of a fiber suspension of less than one pound non-settling volume density (dry weight) and comprising individualized fibers having an average length less than about 0.08" and a waterproofing emulsion.

A further object is to provide a low density composition including the regranulated cork-fiber loose-fill material of my invention as an aggregate, for instance, with a hydraulic cement.

Another object of the invention is to provide a loose-fill packing comprising the regranulated cork-fiber loose-fill material of my invention and a suitable binder substance.

These and other objects of the invention will in part be understood and in part be more specifically pointed out in the following description taken in conjunction with the claims.

In my copending applications aforesaid, I have disclosed low density compositions comprising finely divided particulate substances and finely pulped fiber, which compositions are prepared by intimately mixing in a very dilute solution or dispersion, the particulate substance and finely beaten individualized fibers having an average fiber length less than about 0.08" to form a dilute aqueous suspension of abnormally large non-settling volume in which the particulate substance and fibers are in substantially uniform volumetric distribution. The fiber of said mixture is finely beaten as by a high speed propeller set almost straight and in an aqueous solution or dispersion of at least 90% dilution to produce fiber having a non-settling volume of less than about one pound per cubic foot (dry weight). In this form, the fiber will be slightly gelatinized and will not comprise a large amount of colloidal fiber substance that is detrimental to filtration. A slurry of this character is then filtered without disturbing the matrix as it is formed, and the matrix is gradually subjected to a predetermined pressure without breaking its continuous bonded structure, and is finally dried. The finished product or composition when thus properly made and utilizing the requisite proportions of ingredients set forth in said copending applications, will have the particulate substance and fibers in substantially uniform volumetric distribution with the fibers lying in substantially all directions and presenting with the particulate substance a continuous bonded composition substantially free of parallel matting of the fiber into planes of cleavage so as to produce a substantially uniform physical structure that is microcellular and possesses a multiplicity of substantially microscopic voids having substantially uniform volumetric distribution and constituting at least about 40% of the volume of the composition, and that will present sections of similar appearance when the matrix is cut longitudinally or either way transversely.

Moreover, I have described such bonded structure made without the use of any so-called binder material or with the use of such a small percentage of the same, for instance, a ½% latex or a ½% aqueous resinous dispersion (½% to 3% by weight based on solids) as to make its presence entirely unobjectionable from the standpoint of increase in density, increase in thermal conductivity, and even increase in cost. Moreover, I have described, in said copending applications, the use of a paraffin emulsion that is effective in reducing moisture penetration into the mass of said particulate fiber compositions, and by the use of small amounts thereof, even less than 6% by weight; between 5 to 6% being preferred, but good results being even obtained with ½%. Further description of this general type of effective emulsion, particularly paraffin, is given in my copending application Serial No. 201,082, now Patent No. 2,232,977. The most effective of these emulsions in waterproofing is paraffin, and I have found that by use of additional refinements, hereinafter described, in the method of preparing and using this emulsion, it can be made so effective as to produce new results heretofore considered entirely impossible.

In accordance with the present invention, I make a low density matrix of the aforesaid character, using one or more particulate and fiber substances, for instance, those disclosed in said prior applications, and after drying the matrix, grind the same to a light, fluffy, loose material, as by applying the matrix or slab against a rough revolving cylinder. The particles of loose-fill material produced in this manner will comprise a plurality of the particulate pieces and fibers, and will have the same microcellular structure characteristic of the matrix. Obviously, the non-settling volume density will vary with the particulate and fiber substances in the matrix and high waterproofing properties will be dependent upon the presence of suitable agents for this purpose.

In the preferred embodiment of my invention, I use a composition of finely pulped cellulosic fiber and finely ground regranulated cork and a specific paraffin emulsion. The regranulated cork may be that obtained as a waste product of the cork industry and which has a density of about six pounds per cubic foot. Preferably, however, I use the regranulated cork made by distilling natural waste cork in accordance with my application of even date herewith, and in order to obtain extremely low loose-fill densities I use expanded regranulated cork having a density as low as three pounds per cubic foot, also as described in said copending application. The paraffin emulsion is added to the dilute aqueous suspension of the finely pulped fiber and the fine regranulated cork, preferably between 50 to 200 mesh in size, under the action of a high speed mixer to obtain an intimate dispersion. The resulting mixture is filtered and pressed to a matrix of any desired density, then dried and ground as finely as possible to a light weight fluffy product. I have not been able to determine the size of the resultant particles as screening is not practical. However, the particles each comprise a cork-fiber microcellular structure of similar character to that of the matrix. There will be a small amount of detached fiber and cork particles. These may be separated from the mass if desired, and used over again. However, it is not necessary to remove such material. It should be noted that since the matrix may be pressed as much as desired, it is possible to remove most of the water and thus reduce the drying period. While high pressures will reduce somewhat the size of the cells of the resultant loose-fill particles, the amount will be negligible in view of the springiness of the cork. In fact, a density of about twelve pounds per cubic foot is about the limit to which a matrix of regranulated cork and fiber may be pressed for the compositions herein contemplated. I have found that if proper precautions are taken, the resulting finely ground loose-fill material will be so resistant to the penetration of water into its mass that it may be loosely packed into a cylinder (at say only three to six pounds per cubic foot density) and it will support a column of water several inches over the top of it without allowing the water to penetrate its mass. Generally, the water will, after several days, work its way down along the surface of the cylinder and eventually get below the mass of fiber, raising it to the top of the water where it floats, still not having been penetrated through by the water and being substantially dry within its mass. Under similar conditions, present loose-fill materials such as balsam wool, glass wool, shredded red wood bark, etc., will allow the water to run right through them as it is poured into the cylinder, or at least in a few minutes, the mass of material becoming thoroughly sogged.

Moreover, I have discovered that in preparing the composition matrix, particularly that for the preferred embodiment, it is very desirable to keep the composition as near the neutral point (pH 6.8) as possible, and to avoid strong electrolytes and, in fact, any kind of salts. I have found that good results are obtained when the fiber suspension is neutral to brom-thymol-blue before the addition of the emulsion and the finished product should show a substantially neutral color reaction with the brom-thymol-blue indicator. In order to obtain this result, it is necessary to reduce the amount of soap in the emulsion to such a small figure that emulsification, as described in my copending application Serial No. 201,082, now Patent No. 2,232,977, becomes difficult or impossible unless certain additional steps are taken. These additional steps include the use of a greater amount of water and the use of 10% to 20% of mineral oil with the paraffin. In the above mentioned copending application, a soap solution less than 12½% in concentration, and generally speaking, about 2% for paraffin emulsions is specified, and enough water to produce a finished emulsion of about 50% paraffin concentration. For the improved results of this invention, I employ a soap solution of only about ⅛% to ⅜% and enough water to produce a finished emulsion of only about 25% to 35% paraffin content. The soap is dissolved first and the solution kept at the boiling point. The paraffin and mineral oil are then melted together and the hot soap solution is poured into it. The mixture is heated together to be sure it is at the boiling point of the soap solution and is then subjected to a high speed mixer such as is described in the above mentioned application. Emulsification takes place easily and quickly, and a foamy product results. When allowed to stand and cool and stirred, a milky liquid is obtained. This dilute emulsion creams readily and stiffens in the creamed layer on long standing. It is preferable to use the emulsion before it has stood long enough to stiffen.

For the purpose of giving those skilled in the art a better understanding of the invention, the following illustrative examples are given of preferred methods and products of the invention.

Example No. 1

About 15 grams of sodium stearate soap are dissolved in 10 pounds of water and heated to the boiling point. 3 pounds of ordinary paraffin and ⅓ pound of mineral oil are melted together and the hot soap solution is poured into this melted mixture. Heating is continued to bring this mixture to boiling and it is then subjected to the action of a high speed mixer. A five gallon mixer having a ½" circular blade with a corrugated facing and operated at about 3500 R. P. M. will be found satisfactory. Emulsification is completed in a few minutes. A foamy product is obtained. This is allowed to cool and the foam breaks up, leaving a thin milky liquid which must be stirred before using as it creams readily.

About 10 pounds of news stock are finely pulped in about 500 pounds of water. If a yellow color is obtained when testing the water of the pulp suspension with brom-thymol-blue indicator, it is preferable to drain the water from the fiber suspension and add fresh water, which will give a substantially neutral color reaction with this indicator. About 20 pounds of fine regranulated cork (6 pound density) are then added with high speed mixing. To this pulp suspension, about 7¼ pounds of the previously prepared paraffin emulsion are then added while subjecting the suspension to the action of a high speed mixer. The intimate mixture is then dewatered by filtration and the dewatered matrix may be rolled or pressed as much as desired to remove still more water, and is finally dried. The dried slabs are easily ground to a light, fluffy, loose material, for example, by applying the slab against a rough revolving cylinder.

The loose-fill material thus obtained will have the following unique characteristics. It will resist the penetration of water into its mass when placed in a cylinder and a column of water is poured over it, as described above. It will remain dry under moist surroundings and will not wilt and sog and densify. When subjected to a settling test in a column (3⅜" x 14⅜" x 120" high) vibrated at 1225 cycles per minute with an amplitude of 1/16", and packed to a density of only 4 pounds per cubic foot, the material will show no settling after twenty-four hours. The thermal conductivity at 4 pound density is about 0.26 B. t. u., etc., at a mean temperature of 60° F. This product is particularly useful as a loose-fill insulation material in low temperature refrigeration work. It may be placed between the walls of a refrigerator cabinet or the like without being packaged and without taking special precautions, and may likewise be used in the walls of cold storage rooms with far less danger of moisture penetration than with present loose-fill materials that do not repel water from their masses. The material will also be resistant to fungus growth and decay.

It will be obvious too that since this product repels water throughout its mass and therefore requires no special sealing against moisture, it can be used for packing around objects such as pipe lines that are to be insulated. For this purpose, pipe coverings are now made in the factory from rigid insulating materials such as baked corkboard, and are very expensive, especially the fittings. Due to the fiber content of the product of this invention, it may be packed around an object and will hold together more or less readily. It may be mixed with a liquid or a small amount of a resin binder or the like may be added to facilitate the application by molding around pipe fittings. The finished covering can further be painted on the outside with a resin paint or lacquer. Thus, it is possible to provide a satisfactory low cost method of covering pipe lines and fittings having sufficient moisture resistance throughout to be useful in the low temperature insulation field.

I have found that the remarkable water repellent and thermal insulating properties of this material are transmitted to other compositions with which it is mixed, and from this observation follow other uses. For example, it may be mixed with Portland cement in amounts up to about 25%, and will produce a light-weight product of extremely low moisture absorption. It mixes readily with the cement powder in dry form and the latter clings to the fiber and does not settle out. When ready to use, the mixture is dampened with the proper amount of water to set the cement, and the material is packed into place. With 25% of this loose-fill material and 75% Portland cement, I have obtained products of less than 30 pounds density, having satisfactory strength for building wall construction and having practically no capillarity and a moisture absorption of less than 10% by volume. A slab of this product will feel warm and dry to the touch on one face, even though the opposite face has been submerged under water for several days.

Example No. 2

About 30 pounds of news stock are finely pulped in about 1500 pounds of water, while conducting steam into the suspension in the beater. When the fiber has been individualized and beaten to a condition providing a large non-settling volume density of less than one pound per cubic foot (dry weight), the suspension is run into a vat and the excess water drawn off. The average individual fiber length will be less than about 0.08" and there will be little colloidal fiber. Fresh water is added and the suspension is subjected to the action of a high speed mixer while 7¼ pounds of paraffin emulsion prepared as described above is added. The pulp suspension is then dewatered by filtration and dried. Any type of filtration and drying machine that is efficient may be employed. The dried matrix is finally ground to a light, fluffy, loose fibrous material.

In this case, the product consists entirely of fiber. Although not as good a product as the one of the previous example for low temperature insulation generally, it is much more economical to make and not limited in its uses by the supply of the regranulated cork. It would be more useful, therefore, as a cement aggregate, for example, as suggested above, where low cost and large volume of supply of raw materials would be critical factors.

From the foregoing description and examples, it will be evident that I have provided an entirely new loose-fill material that possesses many new properties not heretofore available, and new methods of processing the materials comprising the same. It will be understood that the principles of the invention are not limited to regranulated cork and cellulosic fiber materials, but may be applied to other particulate fiber compositions. Moreover, the loose-fill material, instead of being of a finely ground size, may be in the form of larger pieces, for instance, ½" or less. Of course, such a product would not be fluffy in character. It will also be evident that various modifications will be obvious and others will readily suggest themselves to those skilled in the art, all, however, without departing from the spirit and scope of my invention, which I desire to have construed as broadly as the following claims may allow.

I claim:

1. A loose-fill material comprising a multiplicity of light weight comminuted composition pieces, the individual pieces comprising particles of a particulate substance and pulped fibers essentially of an average fiber length less than about 0.08 inch and presenting a bonded self-sustaining microcellular structure, with the particles and fibers in substantially uniform volumetric distribution and the fibers extending in substantially all directions such that a mass of said pieces gives a fluffy appearance and will not settle to a high density.

2. A loose-fill material comprising a multiplicity of light weight comminuted composition pieces, the individual pieces comprising particles between 50 to 200 mesh in size, of a substantially water insoluble particulate substance and pulped fibers essentially of an average fiber length less than about 0.08 inch, said pieces presenting a bonded self-sustaining microcellular structure, with the particles and fibers in substantially uniform volumetric distribution and the fibers extending in all directions such that a mass of said pieces gives a fluffy appearance and will not settle to a high density.

3. A loose-fill material characterized by substantial resistance to capillary action, comprising a multiplicity of light weight comminuted composition pieces, the individual pieces comprising particles of particulate substance and pulped fibers essentially of an average fiber length less than about 0.08 inch and presenting a bonded self-sustaining microcellular structure, with the particles and fibers in substantially uniform volumetric distribution and the fibers extending in all directions such that a mass of said pieces gives a fluffy appearance and will not settle to a high density; the said pieces including a waterproofing agent in amount as not to substantially increase the density of said pieces yet sufficient to substantially eliminate capillary action in a settled mass of said pieces.

4. A loose-fill material comprising a multiplicity of light weight comminuted composition pieces, the individual pieces comprising essentially finely divided regranulated cork and pulped fibers essentially of an average fiber length less than about 0.08 inch, and presenting a bonded self-sustaining microcellular structure with the cork and fibers in substantially uniform volumetric distribution and the fibers extending in substantially all directions, such that a mass of said pieces gives a fluffy appearance and will not settle to a high density.

5. A light weight, fluffy, loose-fill material of fibrous character, comprising individual composition pieces including bonded finely divided regranulated cork and finely divided fiber said loose-fill material characterized by a density of no greater than about four pounds per cubic foot when settled by vibration.

6. A loose-fill material as claimed in claim 5, wherein the regranulated cork has a density of about three to about six pounds per cubic foot.

7. A light weight, fluffy, water-repellent, loose fibrous material capable of supporting a column of water several inches high above it in a cylinder for 24 hours when packed to a density of six pounds per cubic foot, comprising a cellulosic fibrous material, fine regranulated cork and less than about 7% of dispersed paraffin, less than about 1% of dispersed mineral oil, and less than about 0.07% soluble soap, said material being substantially free from strong electrolytes and having a substantially neutral color reaction with brom-thymol-blue indicator, said material having a thermal conductivity of about 0.26 B. t. u./hr./sq. ft./inch thickness per degree Fahrenheit, at a mean temperature of 60° F. when packed to a density of four pounds per cubic foot, and said material being capable of withstanding vibration for 24 hours in a high column without settling to a density substantially greater than four pounds per cubic foot.

8. The process of producing a light weight, fluffy, water-repellent, loose fibrous material capable of resisting the penetration of water into its mass when loosely packed in a confining space, comprising forming an emulsion by subjecting about 25% of melted paraffin containing mineral oil in an amount about 10% to 20% of the paraffin together with about 75% of a ⅛% to ⅜% aqueous soap solution to the action of a high speed mixer, adding from 2% to 8% of this emulsion by high speed mixing to a dilute pulp suspension comprising cellulosic fiber and regranulated cork, filtering said pulp suspension, and drying and grinding the resultant product to a light, fluffy, loose material, said suspension having a substantially neutral color reaction to brom-thymol-blue indicator, said percentages of materials being calculated in the dry weight of solids in the product.

9. A process of forming a light weight loose-fill material which comprises embodying a fibrous extension medium in an aqueous mass containing a finely powdered, light weight, substantially water-insoluble material for producing an enlarged, uniform dispersion of said material in an aqueous mixture, in which the fibrous portion alone has a non-settling volume of about one pound per cubic foot and less dry weight, whereby such abnormally large volumetric dispersion of said powdered material will be maintained during filtration and compression, filtering and compressing said mass to form a matrix, drying said matrix and grinding said dried matrix into a light weight loose-fill material.

10. A process as claimed in claim 9, including the step of adding to the suspension a waterproofing emulsion.

11. A loose-fill material comprising a multiplicity of comminuted composition pieces comprising divided cork, finely divided fiber essentially of an average length less than about 0.08 inches and a water repellent agent in amount as not to substantially increase the density of said pieces; said pieces having a bonded microcellular structure and being capable of supporting a column of water several inches high above it in a cylinder for at least about 24 hours when packed to a density of about six pounds per cubic foot or more and said material giving a neutral reaction to a brom-thymol-blue indicator test.

12. A loose-fill material comprising a light fluffy loose fibrous mass comprising essentially finely pulped individualized fibers of an average fiber length less than about 0.08 inches and a water repellent agent in amount as not to substantially increase the density of the mass, said material being capable of supporting a column of water several inches high above it in a cylinder for at least 24 hours when packed to a density of six pounds per cubic foot or less.

13. A loose-fill material as claimed in claim 12, in which said fater repellent agent comprises dispersed paraffin.

14. A process of producing a light weight, loose-fill material capable of a high degree of moisture resistance comprising mechanically beating fibrous material having an average fiber length of less than about 0.08 inches in an aqueous mixture of at least 90% dilution, giving a neutral color reaction to a brom-thymol-blue indicator test, to produce fibrous material characterized by a non-settling volume of about one pound per cubic foot and less dry weight, adding to the mixture a water emulsion of a water repellent material and without changing said neutral reaction to the indicator, dewatering to form a matrix, drying, and grinding the matrix thus formed to a light, fluffy, loose, fibrous material.

15. A hardened cement composition comprising hydraulic cement and loose-fill material as claimed in claim 12 up to 25% in amount, said composition having a low density, a moisture absorption of less than about 10% by volume, a satisfactory strength for building wall construction, and a slab of said composition feeling warm and dry to the touch on one face even though the opposite face has been submerged in water for several days.

16. A composition comprising the loose-fill material of claim 12 and a binder.

CHARLES H. SCHUH.